United States Patent

[11] 3,574,354

| [72] | Inventor | Howard T. Mischel<br>Middletown, R.I. |
|---|---|---|
| [21] | Appl. No. | 822,958 |
| [22] | Filed | May 8, 1969 |
| [45] | Patented | Apr. 13, 1971 |
| [73] | Assignee | Avica Corporation<br>Middletown, R.I. |

[54] FLEXIBLE COUPLING
8 Claims, 6 Drawing Figs.

[52] U.S. Cl. .................................................. 285/16,
285/226, 285/382
[51] Int. Cl. ..................................................... F16l 55/00
[50] Field of Search .......................................... 285/16,
226, 227, 228, 229, 299, 300, 301, 382, 382.1,
382.2, 382.4

[56] References Cited
UNITED STATES PATENTS

| 282,967 | 8/1883 | Duffy ........................... | 285/226 |
| 2,014,355 | 9/1935 | Hussman ..................... | 285/226X |
| 2,485,370 | 10/1949 | Dreyer ......................... | 285/228 |
| 3,438,657 | 4/1969 | Torres.......................... | 285/382.4X |

FOREIGN PATENTS

| 609,137 | 11/1960 | Canada ........................ | 285/226 |
| 667,144 | 11/1938 | Germany..................... | 285/226 |

*Primary Examiner*—Dave W. Arola
*Attorney*—Blair, Cesari and St. Onge

ABSTRACT: The disclosed flexible coupling is for joining sections of rigid conduit, with provision for angular and axial flexibility, and static sealing against fluid leakage. The conduit sections are interconnected by a tubular metal bellows, secured by split rings and a coupling nut to ferrules swaged to the conduit ends. O-ring or similar seals are provided in recesses in the ferrules abutting the ends of the metal bellows to provide sealing means which do not flex despite lateral and axial flexure of the bellows. The coupling may be readily removed or repaired in situ by manual removal of the coupling nut and release of the split rings. In an alternate embodiment at least one of the bellows ends is swaged in place between the ferrule and the conduit end, eliminating and O-ring seal.

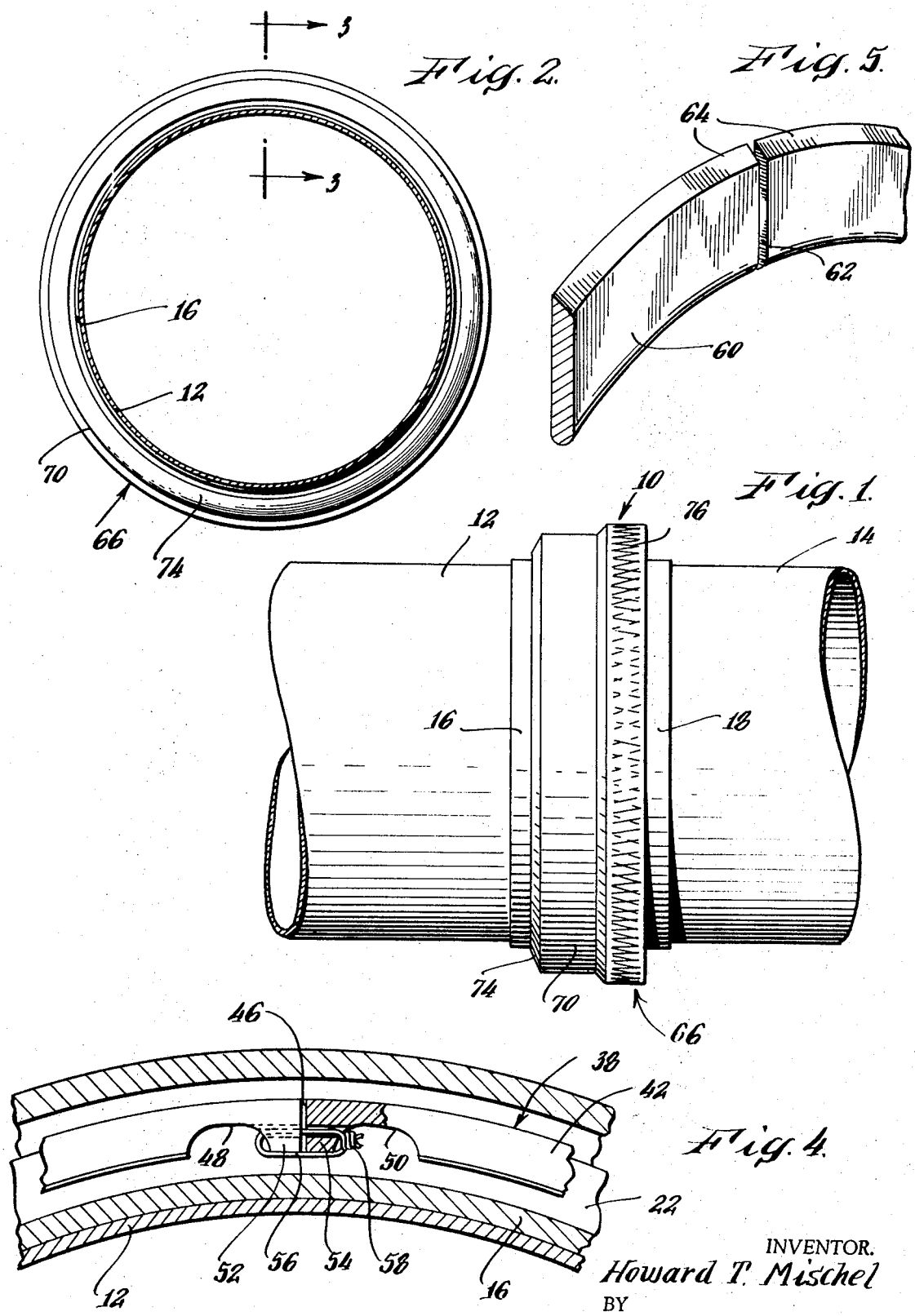

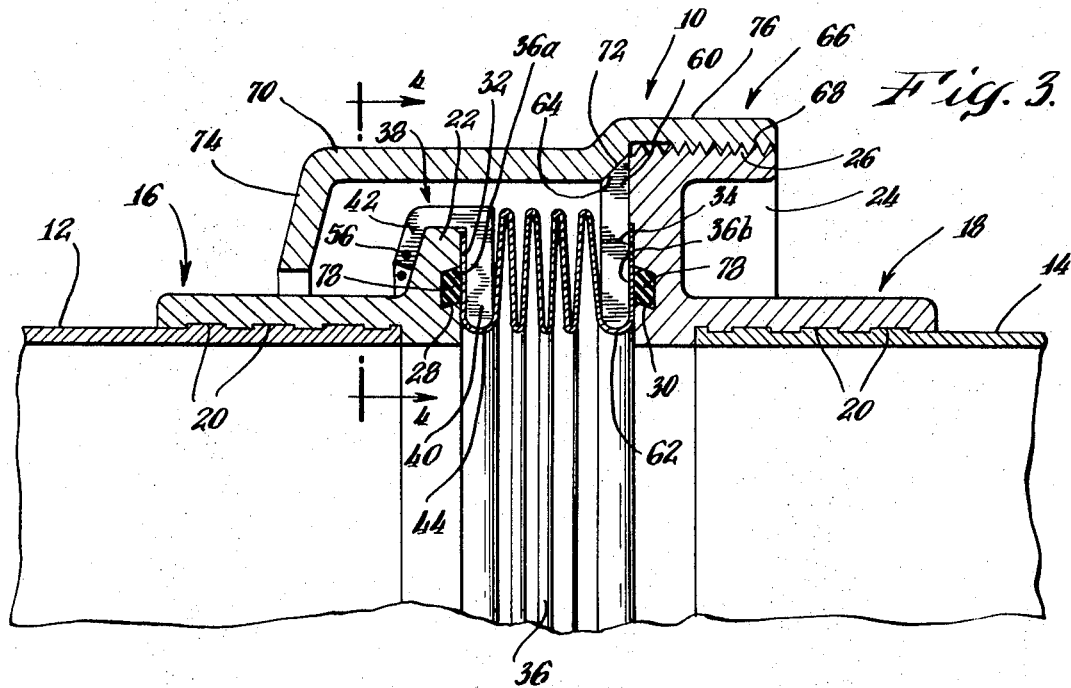

FLEXIBLE COUPLING

BACKGROUND OF THE INVENTION

Flexible couplings for rigid conduit such as pipe or ducting are widely used in applications requiring flexible joints to absorb expansion or contraction due to temperature change and/or stresses due to vibration, impact, acceleration and the like. Flexible couplings also permit a degree of leeway during installation so that precise dimensional control of components is not needed. One common application of flexible couplings is in connecting rigid components of aircraft fuel and pneumatic systems.

Prior art flexible couplings, however, have suffered from several disadvantages. One shortcoming has been in the degree of flexibility afforded. Some couplings have permitted only axial movement, others only lateral or angular movement. For aircraft and similar uses however, it is desirable to have a degree of flexibility in axial and angular directions, i.e., substantially universal flexibility to compensate for both expansion and contraction, dimensional imperfections and expected and unexpected stresses due to shock and acceleration.

Another problem arises with respect to the seals which are used in the flexible coupling to prevent leakages of the fluid in the system. In prior art couplings these seals have been of the dynamic type, that is, they have had to flex along with the coupling. However, the requirement of flexibility is a limiting factor. It is difficult if not impossible to find sealing materials which retain their sealing qualities and also their flexibility over a wide range of temperatures and for extended periods. Loss of resilience due to temperature, aging and fatigue have caused so-called dynamic seals to be unreliable and therefore, a weak link in the conduit system.

Additionally, prior art flexible couplings have often been complicated, bulky and heavy, and therefore difficult to install and repair.

Accordingly, representative objects of the present invention are to provide an efficient flexible coupling for rigid conduit which is universally flexible, which has static seals, which is small, lightweight, easy to install and repair, and which is simply constructed and economical to manufacture.

Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

SUMMARY OF THE INVENTION

The present invention relates to a flexible coupling for rigid conduit and more particularly to a flexible coupling permitting axial and angular flexibility and providing for static sealing against fluid leakage.

The coupling comprises a tubular, flexible metal bellows secured to ferrules swaged or otherwise secured to adjacent ends of the conduit sections to be joined. The metal bellows provides an effective means of achieving relative axial and angular flexibility between conduit sections while providing continuity of flow through the conduit.

The bellows is preferably secured to the respective ferrules by a pair of split rings which are mounted in the end convolutions of the bellows; one, a retainer ring, fits over an abutment on one ferrule and is preferably lockwired in place for easy removal and replacement. The other split ring is urged against its ferrule by a coupling nut which screws onto the ferrule. Sufficient clearance is left between mating parts of the coupling so that a desired amount of axial and lateral flexing can occur.

The construction of the flexible coupling makes removal and replacement simple. Replacement of the bellows, the part most likely to fail or to need replacement if any, can be made in situ and without removal of any conduit sections by merely unscrewing the coupling nut and releasing the lockwire on the retainer ring. These operations can be readily performed manually with the aid of only simple handtools. Such easy and in situ maintenance is of great importance in applications such as aircraft fuel and hydraulic systems.

The coupling may also be provided with static fluid seals preferably comprising O-rings recessed in the ferrule surfaces abutting the bellows ends. Since the seals are static, that is, undergo substantially no flexing during either axial or angular flexure of the bellows, they are highly reliable and long lasting. Moreover, the problem of maintaining seal resiliency at elevated or low temperatures, and over long periods of use is greatly reduced since the seals are not required to flex.

The structure of the invention also provides a more compact and lightweight coupling, further simplifying assembly and disassembly and enhancing its use in applications such as aircraft.

BRIEF DESCRIPTION OF THE DRAWINGS

For a fuller understanding of the nature and objects of the invention, reference should be had to the following detailed description taken in connection with the accompanying drawings, in which:

FIG. 1 is a side elevation view of the flexible coupling of the invention joining two sections of rigid cylindrical pipe.

FIG. 2 is a left end view of the coupling of FIG. 1.

FIG. 3 is an enlarged, partial sectional view of the coupling taken along line 3–3 of FIG. 2.

FIG. 4 is a greatly enlarged sectional view taken along line 4–4 of FIG. 3 and showing one manner of securing the retainer ring.

FIG. 5 is an enlarged, partial isometric view of the split ring.

FIG. 6 is an enlarged, partial sectional view of an alternate embodiment of the coupling shown in FIG. 3.

Similar reference characters refer to similar parts throughout the several views of the drawings.

DESCRIPTION OF THE PREFERRED EMBODIMENTS

Referring now to FIG. 1, the flexible coupling 10 of the invention is shown interconnecting two segments 12 and 14 of cylindrical pipe conduit. It can be seen however, that various types and shapes of conduit can be joined by flexible coupling 10 and it is not intended that the invention be limited to a cylindrical pipe coupling.

As shown in FIG. 3, coupling 10 comprises a pair of ferrules 16 and 18 affixed to respective adjacent ends of conduit 12 and 14. Ferrules 16 and 18 are preferably secured to the conduit ends by swaging and for this purpose are provided with interior grooves 20. Upon swaging, grooves 20 interlock with the surface of the conduit as shown in FIG. 3 to form a secure and fluid tight connection. Alternatively, however, ferrules 16 and 18 may be secured by a welded, brazed, soldered, threaded or sweated joint, or the like.

Ferrule 16, herein termed a female ferrule, is provided with an upstanding abutment 22 adjacent the open end of its conduit segment 12. Ferrule 18, herein termed a screw-adapter ferrule, differs from ferrule 16 in that it is provided with a larger diameter upstanding flange 24 adjacent the open end of its respective conduit segment 14. Flange 24 is also preferably threaded on its outer peripheral surface 26. Both ferrules 16 and 18 are respectively provided with ring-shaped recesses 28 and 30 on their opposed surfaces 32 and 34. Recesses 28 and 30 form part of a static seal for preventing fluid leakage from the interior of the conduit as is more fully discussed hereinafter.

The two segments 12 and 14 of the conduit are interconnected by a tubular member which is flexible in both axial and angular directions. Preferably, as shown in FIG. 3, the axially and angularly flexible tubular connector comprises a metal bellows 36. The material from which bellows 36 is formed and the number of convolutions therein may vary depending upon the material conveyed by the conduit, the operating conditions, and the degree of flexibility desired.

Bellows 36 is secured at one end to ferrule 16 by a retainer ring 38 as shown in FIG. 3. Retainer ring 38 is U-shaped in cross section thus providing an inner 40 land outer 42 flange. Inner flange 40 is mounted within the last convolution 44 at one end of bellows 36. To facilitate the insertion of flange 40 into convolution 44, retainer ring 38 is preferably split at one end as shown in FIG. 4. Additionally, ring 38 may be notched or partially split at other points in its periphery to reduce the force required to open the ring for installation. The slot 46 which splits ring 38 extends through both inner and outer flanges 40 and 42. Retainer ring 38 is mounted to ferrule 16 by clamping inner and outer flanges 40 and 42 over abutment 22 (FIG. 3). The two split portions of retainer ring 38 are then preferably lockwired as shown in FIG. 4 to keep ring 38 in place. To permit lockwiring, outer flange 42 of ring 38 is provided with cutout portions 48 and 50 on either side of slot 46 (FIG. 4) producing a pair of opposed tabs 52 and 54. Tabs 52 and 54 are preferably drilled through for receipt of a lockwire 56. Lockwire 56 is inserted through the openings in tabs 52 and 54 and then bent around and twisted at one end 58 to complete the secured mounting of retainer ring 38 to ferrule 16.

Still referring to FIG. 3, a second split ring 60 is mounted in the last convolution 62 at the opposite end of bellows 36. Split ring 60, like retainer ring 38, is provided with a slot 62 (FIG. 5) and may be notched or partially split to facilitate its insertion into convolution 62. Further, the outer periphery 64 of ring 60 is beveled to cooperate with the mating surface of a coupling nut to secure bellows 36 in place.

Coupling nut 66 completes the assembly of flexible coupling 10 as shown in FIG. 3. Nut 66 preferably comprises a threaded interior portion 68 which is threaded over the corresponding threaded portion 26 of ferrule 18. A skirt portion 70 extends from threaded portion 68 and acts as a protective cover over the bellows 36. A beveled surface 72 is provided at the interior of nut 66 at the juncture between threaded portion 68 and skirt 70. It can be seen in FIG. 3 that as coupling nut 66 is threaded onto ferrule 18, beveled portion 72 engages the beveled periphery 64 of split ring 60, thereby closing the ring and urging it against surface 34 of ferrule 18 to secure bellows 36 in position between conduit segments 12 and 14. Alternatively, nut 66 may be secured to ferrule 18 by clamping or bolting.

Protective skirt 70 terminates in an overhanging lip 74 which further protects the interior of the flexible coupling from damage due to foreign objects. It is important however, that sufficient clearance be left both between lip 74 and flange 42 of retainer ring 38, and between lip 74 and the swaged portion of ferrule 16 so that a desired amount of axial and angular movement can occur between conduit segments 12 and 14. The clearance provided for this purpose can be clearly seen in FIG. 3.

As shown in FIG. 1, the outer surface 76 of coupling nut 66 over threaded portion 68 is preferably knurled or otherwise roughened to facilitate manual threading thereof. Additionally or alternatively, the outer surface of skirt 70 may be knurled or roughened for manual threading.

The flexible coupling of the invention can be easily assembled and disassembled in situ. This is of great importance in applications such as aircraft fuel and hydraulic lines. It is particularly important that the bellows be easily removable since it is likely to be the first component, if any, of the flexible coupling to fail under service conditions. To disassemble the coupling as shown in FIG. 3, one need merely unscrew coupling nut 66 from ferrule 18. This releases split ring 60 thereby freeing one end of bellows 36 and disengaging conduit segment 14 from segment 12. Upon removal of coupling nut 66, the other end of bellows 36 is released by unwinding and removing lockwire 56 (FIG. 4). Retainer ring 38 may then be removed from abutment 22 and bellows 36 removed for replacement or repair. The steps are merely reversed for reassembly which is equally quick and simple. Assembly and disassembly can be done entirely by hand with the use of a few simple tools making the flexible coupling of the invention ideal for applications which may require on-the-spot emergency repairs.

The flexible coupling may also be provided with sealing means to prevent fluid leakage from inside the conduit. As shown in FIG. 3, a resilient packing 78 is placed within each ring-shaped recess 28 and 30 in ferrules 16 and 18. Packing 78 preferably comprises a resilient O-ring which is selected from a material which will withstand chemical attack by the fluid medium in the conduit, and which will retain sufficient resiliency for static sealing under operating conditions. Alternatively, gaskets or similar suitable static seals may be used.

As shown in FIG. 3, when flexible coupling 10 is assembled the ends 36a and 36b of bellows 36 are pressed tightly against O-rings 78 to form an effective seal. Significantly, it can be seen that despite any axial and lateral flexure which bellows 36 may undergo, O-rings 78 are not required to flex, and undergo no further distortion than that due to the pressure exerted upon assembly.

O-rings 78 in their respective recesses 28 and 30 thus form a pair of static sealing means. Since substantially no flexure is required of O-rings 78 in use, the problems due to loss of resiliency from aging, temperature change and fatigue common in dynamic seals is essentially eliminated. The coupling of the invention is therefore highly attractive for use in cryogenic and very high temperature environments. Prior art flexible couplings have not been useful in these environments because the dynamic seals thereof have lacked sufficient resiliency at these extreme temperatures.

Although associated with a dynamic member, that is bellows 36, the seals formed by O-rings 78 are as reliable as any other static seal in the conduit system such as those in a rigid pipe joint. Further, the expense due to seal maintenance and replacement common to prior art structures is to a large degree eliminated by the present invention.

Where simple in situ replacement and repair of coupling components is not of primary importance, an alternate embodiment of the invention as shown in FIG. 6 may be used. The embodiment of FIG. 6 is identical in all respects with the embodiment of FIG. 3 except for the elimination of the retainer ring and one O-ring seal. Instead of being held in place by a retainer ring, the left end 80 of bellows 36 as seen in FIG. 6 is made somewhat longer and extended out perpendicular to the convolutions. End 80 is then placed between conduit segment 12 and ferrule 16 and the three members swaged together as shown. The swaged joint between segment 12, ferrule 16 and bellows end 80 is itself fluid tight, eliminating the need for a separate static seal at that end. Although the right end of bellows 36 in the embodiment of FIG. 6 is sealed in the same manner as the right end in the embodiment of FIG. 3, it will be understood that this end may also be swaged between ferrule 18 and conduit segment 14 if desired.

As in the embodiment of FIG. 3, sufficient clearance is left in the embodiment of FIG. 6 between overhanging lip 74 and abutment 22 of ferrule 16, and between lip 74 and the swaged portion of ferrule 16 so that a desired amount of axial and angular movement can occur between conduit segments 12 and 14.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

I claim:

1. A flexible coupling for rigid conduit comprising, in combination:

a. axially and angularly flexible tubular connector means comprising a tubular bellows,
b. a pair of ferrules mounted to adjacent ends of a pair of conduit segments connected by said coupling, the ferrule at one end being a screw adapter,
c. fastening means for securing each end of said bellows to said ferrules and providing clearance for relative axial, lateral and angular movement between said conduit segments, said fastening means at said one end comprising a ring mounted within the corresponding end convolution of said bellows, and a coupling nut threadedly engaged on said screw adapter ferrule bearing against said ring and to urge said ring and bellows convolution against a surface of said screw adapter ferrule, said ring and said coupling nut having engaging complementary surfaces at the position where said nut bears against said ring, and
d. sealing means between said ring and said screw-adapter ferrule forming a static seal against fluid leakage from within said conduit, said static seal remaining static during axial or angular flexure of said bellows.

2. A flexible coupling as defined in claim 1 including a ring-shaped recess in the surface of said screw-adapter ferrule bearing against the said end convolution of said bellows, and said sealing means comprising a sealing member mounted in said recess and forming said static seal against fluid leakage during axial or angular flexure of said bellows.

3. A flexible coupling as defined in claim 1 wherein said ferrules are swaged to their respective conduit ends.

4. A flexible coupling for rigid conduit comprising, in combination:
a. an axially and angularly flexible tubular connector comprising a tubular bellows,
b. a pair of ferrules mounted to adjacent ends of a pair of conduit segments connected by said coupling comprising a female ferrule having an upstanding abutment and secured to the end of one said conduit segment, and a screw adapter ferrule secured to the end of the other said conduit segment, and
c. fastening means for securing each end of said bellows to said ferrules and providing clearance for relative axial and angular movement between said conduit segments comprising a first double-flanged retainer ring of U-shaped cross section having one flange mounted within one end convolution of said bellows and the other flange thereof looped over and secured against one surface of said abutment on said female ferrule thereby holding said one flange and associated bellows convolution against the opposite surface thereof, a second ring having a beveled outer periphery and mounted within the opposite end convolution of said bellows, and a coupling nut with an interior beveled surface threadedly engaged on said screw-adapter ferrule with said interior beveled surface bearing against said beveled outer periphery of said second ring and urging said second ring and associated bellows convolution against a surface of said screw-adapter ferrule.

5. A flexible coupling as defined in claim 4 including a first ring-shaped recess in the surface of said female ferrule bearing against one end of said bellows, and a second ring-shaped recess in the surface of said screw-adapter ferrule bearing against the other end of said bellows, and a resilient packing in each said recess forming a static seal against fluid leakage during axial or angular flexure of said bellows.

6. A flexible coupling as defined in claim 5 wherein each said resilient packing comprises an O-ring.

7. A flexible coupling as defined in claim 4 wherein said first retainer ring and said second ring are split to facilitate the mounting thereof within respective end convolutions of said bellows.

8. A flexible coupling as defined in claim 3 wherein the end of said bellows opposite the end secured to said screw-adapter ferrule is in turn secured by being swaged between the other said ferrule and the underlying conduit segment.